United States Patent
Harrison et al.

(10) Patent No.: US 9,587,657 B2
(45) Date of Patent: Mar. 7, 2017

(54) SENSOR ARRANGEMENT FOR A ROTATABLE ELEMENT

(71) Applicant: Salunda Limited, Oxfordshire (GB)

(72) Inventors: Martin Roy Harrison, Northants (GB); Philip Samuel Pickles, Oxfordshire (GB); Peter Wherritt, Oxfordshire (GB)

(73) Assignee: Salunda Limited, Oxfordshire (GB)

( * ) Notice: Subject to any disclaimer, the term of this patent is extended or adjusted under 35 U.S.C. 154(b) by 45 days.

(21) Appl. No.: 14/640,972

(22) Filed: Mar. 6, 2015

(65) Prior Publication Data

US 2015/0260550 A1    Sep. 17, 2015

(30) Foreign Application Priority Data

Mar. 13, 2014 (GB) .................................. 1404460.6

(51) Int. Cl.

| | |
|---|---|
| *G01D 5/243* | (2006.01) |
| *F15B 19/00* | (2006.01) |
| *G01D 5/20* | (2006.01) |
| *F04D 15/00* | (2006.01) |

(52) U.S. Cl.
CPC .......... *F15B 19/00* (2013.01); *F04D 15/0088* (2013.01); *G01D 5/2006* (2013.01)

(58) Field of Classification Search
CPC .... F15B 19/00; F04D 15/0088; G01D 5/2006
USPC .............. 324/654, 160, 164, 166, 173, 174
See application file for complete search history.

(56) References Cited

U.S. PATENT DOCUMENTS

| | | | |
|---|---|---|---|
| 3,728,565 A | 4/1973 | O'Callaghan | |
| 3,961,214 A | 6/1976 | Lokkart | |
| 4,267,470 A * | 5/1981 | Kawakami | G01D 5/24404 324/207.22 |
| 4,518,917 A | 5/1985 | Oates et al. | |
| 4,752,732 A * | 6/1988 | Van Schoiack | G01D 5/243 324/207.18 |

(Continued)

FOREIGN PATENT DOCUMENTS

| | | |
|---|---|---|
| EP | 0359422 A1 | 3/1990 |
| EP | 0362527 A2 | 4/1990 |

(Continued)

*Primary Examiner* — Billy Lactaoen
(74) *Attorney, Agent, or Firm* — Honigman Miller Schwartz and Cohn LLP

(57) ABSTRACT

A sensor arrangement for a rotatable element comprises two coils capable of being driven by oscillatory drive signals to generate electromagnetic fields. The coils are in different positions overlying a cylindrical portion of the rotatable element that has a target feature configured to interact with the generated electromagnetic fields when the target feature is aligned with the coils. Alignment between the target feature and the coils occurs at angular positions of the rotatable element that are offset for respective coils. Thus, by detecting a characteristic of the signals developed across the coils allowing derivation of an angular velocity signal representative of angular velocity. Also, the degree of interaction between the target feature and the electromagnetic fields varies with the axial position of the rotatable element, differentially between the coils, allowing derivation of an axial position signal representative of the axial position of the rotatable element.

12 Claims, 3 Drawing Sheets

(56) References Cited

U.S. PATENT DOCUMENTS

| | | |
|---|---|---|
| 5,952,822 A | 9/1999 | Kayserman et al. |
| 8,347,953 B1 | 1/2013 | Elizondo, Jr. et al. |
| 2002/0011840 A1 | 1/2002 | Li |
| 2009/0021243 A1 | 1/2009 | Schunk |
| 2010/0213929 A1* | 8/2010 | Gregg .................... F01D 11/20 |
| | | 324/207.15 |
| 2013/0076373 A1 | 3/2013 | Karenowska et al. |
| 2013/0272898 A1 | 10/2013 | Toh et al. |

FOREIGN PATENT DOCUMENTS

| | | |
|---|---|---|
| EP | 1249693 A2 | 10/2002 |
| EP | 2713137 A1 | 4/2014 |
| GB | 2294549 A | 5/1996 |
| GB | 2495388 A | 4/2013 |
| JP | 2008064633 A | 3/2008 |
| WO | WO-2007099282 A1 | 9/2007 |
| WO | WO-2009034305 A2 | 3/2009 |
| WO | WO-2011012843 A1 | 2/2011 |

\* cited by examiner

Fig. 8
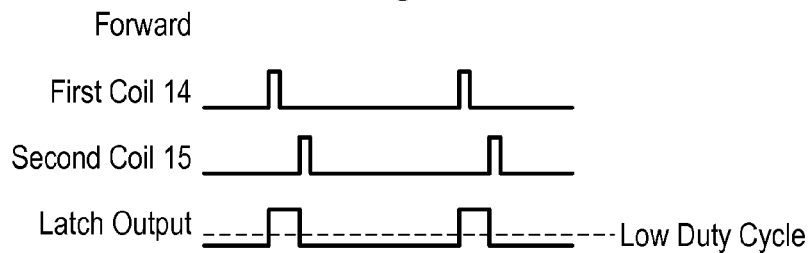
Fig. 9
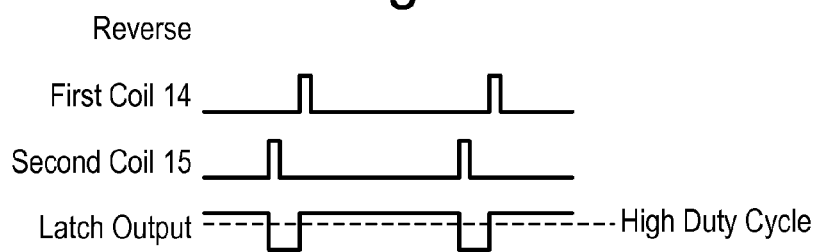
Fig. 10(a)  Fig. 10(b)  Fig. 10(c)
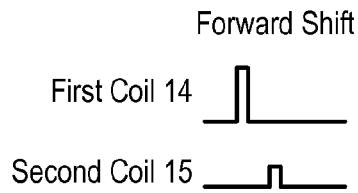 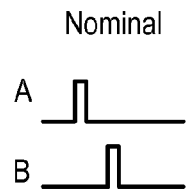 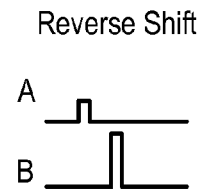
Fig. 11
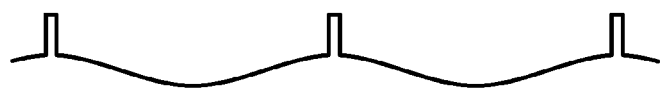
Fig. 12

SENSOR ARRANGEMENT FOR A ROTATABLE ELEMENT

BACKGROUND

The present invention relates to a sensor arrangement for a rotatable element.

Many rotating machines have rotatable elements for which the need for monitoring is well established. Such monitoring is needed for control purposes and/or to ensure proper and safe operation. In some cases, there is a need to monitor more than one operational parameter. For example, angular velocity is a key operational parameter, but it may be desired to monitor other operation parameters such as axial offset and/or eccentricity of rotation.

Also, in many fields, the operating conditions may be harsh, requiring sensor systems to be robust and reliable. By way of example, the petrochemical and mining industries employ many such machines that need monitoring in operating conditions that are typically harsh. An example of a rotating machine used in these industries is an electro-submersible pumps. Such pumps are usually driven by electric motors and there is existing technology for protecting the motors from overheating and detecting stall conditions using motor current.

However, there remains a need for sensor arrangements that can monitor the dynamic behavior of the pump rotation itself. Existing sensor arrangements are sometimes not ideal and typically confined to sensing of one operational parameter such as angular velocity or torque, requiring additional sensors to measure other parameters.

The present invention is concerned with the provision of an improved sensor arrangement.

SUMMARY

According to a first aspect of the present invention, there is provided a sensor arrangement for a rotatable element, the sensor arrangement comprising:

a rotatable element having a cylindrical portion;

at least two coils overlying the cylindrical portion in different positions and capable of being driven by oscillatory drive signals to generate electromagnetic fields, wherein the cylindrical portion has at least one target feature that is configured to interact with electromagnetic fields generated by the coils when the target feature is angularly aligned therewith, the coils and the target feature being configured so that alignment between the at least one target feature and the coils occurs at angular positions of the rotatable element that are offset for respective coils, and so that the degree of interaction between the at least one target feature and the electromagnetic fields generated by the coils when the at least one target feature is angularly aligned with the respective coils varies with the axial position of the rotatable element.

The sensor arrangement makes use of a target feature on the cylindrical portion that interacts with electromagnetic fields generated in the coils when the target feature is aligned therewith. The sensor arrangement allows the angular velocity of the rotatable element to be sensed by configuring the coils and the target feature so that alignment between the target feature and the coils occurs at angular positions of the rotatable element that are offset for respective coils. This means that the interaction with each coil occurs at different timings. Thus, the difference between the timings of the interactions between the target feature and the electromagnetic fields generated by the coils can be used to derive an angular velocity signal representative of the angular velocity of the rotatable element.

Also, the coils and the target feature are configured so that the degree of interaction between the target feature and the electromagnetic fields generated by the coils when the at least one target feature is angularly aligned with the respective coils varies with the axial position of the rotatable element. As a result, the degree of interaction between the target feature and the electromagnetic fields generated by the coils when the at least one target feature is angularly aligned with the respective coils may be detected and used to derive an axial position signal representative of the axial position of the rotatable element.

Advantageously, the coils and the target feature may be configured so that the degree of interaction between the at least one target feature and the electromagnetic fields generated by the coils when the at least one target feature is angularly aligned with the respective coils varies with the axial position of the rotatable element differentially between the coils. This allows the differential between the degree of interaction between the target feature and the electromagnetic fields generated by each coil to be used in the determination of axial position, which improves reliability and accuracy.

In addition, the sensor arrangement allows other operational parameters of the rotatable element to be sensed, for example as follows.

Eccentricity in the rotation of the rotatable element may be sensed. The degree of interaction between the cylindrical portion outside the target feature and the electromagnetic fields generated by the coils may be detected and used to derive an eccentricity signal representative of eccentricity in the rotation of the rotatable element.

Clearance between the rotatable element and the coils may be sensed. Characteristics of signals developed across the coils that are dependent on the clearance may be detected and used to derive a clearance signal representative of clearance between the rotatable element and the coils.

Thus, the sensor arrangement provides for non-contact sensing of angular velocity, axial position and optionally other operational parameters. This allows monitoring of the dynamic behavior of the rotatable element. The nature of the sensor element in providing non-contact sensing using electromagnetic fields provides robustness and reliability, allowing use in harsh environments, for example as are commonly experienced by rotating machines in petrochemical and mining industries.

The coils may be encased in a sensing element having a curved surface facing the rotatable element allowing a single sensing element to be provided adjacent the rotatable element in a simple and robust manner. This is more convenient than deploying multiple sensors for measuring different operational parameters.

The sensor arrangement may further comprise an electrical circuit for operating the coils as a sensor. For example, the sensor arrangement may further comprise: a drive circuit arranged to supply oscillatory drive signals to the coils for generating electromagnetic fields in the coils; and a detector circuit arranged to detect a characteristic of the signals developed across the coils that is dependent on the interactions between the at least one target feature and the electromagnetic fields generated by the coils. The detector circuit may use the detected characteristic to derive signals representative of the operational parameters that are sensed.

BRIEF DESCRIPTION OF THE DRAWINGS

FIGS. 8 and 9 are diagrams of signals when the shaft is rotating in forward and reverse directions, respectively;

FIGS. 10(a) to (c) are diagrams of signals for different axial positions of the shaft;

FIGS. 11 and 12 are diagrams of signals during eccentric shaft rotation that is oscillatory and vibratory, respectively.

FIG. 1 shows a sensor arrangement 1 for a shaft 2 that is rotatable in a housing 3 in a direction A. The shaft 2 is therefore an example of a rotatable element. The shaft has a cylindrical portion 4.

DETAILED DESCRIPTION

Figure 1:
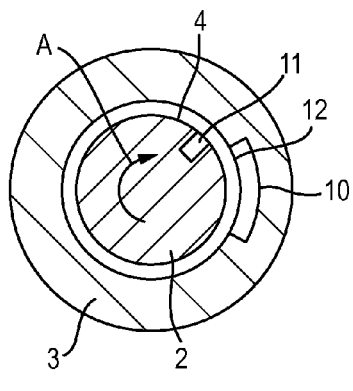
FIG. 1 is a cross-sectional view of a sensor arrangement for a shaft.

The sensor arrangement 1 comprises a sensor element 10 and a target feature 11. The sensor element 10 is mounted in the housing 3 and has a curved surface facing the cylindrical portion 4 of the shaft 2 which therefore rotates past the sensor element 10. The target feature 11 is formed in the cylindrical portion 4 of the shaft 2 and in this example is an indentation.

The sensor element 10 comprises a body 13 encasing two coils 14 and 15 overlying the cylindrical portion 4 of the shaft 2 in different positions. Where the sensor element 10 is subject to a harsh environment, such as high pressure and/or temperature, the sensor element 10 may be made of materials that can withstand that, the simple design of the sensor element facilitating this.

Figure 2:
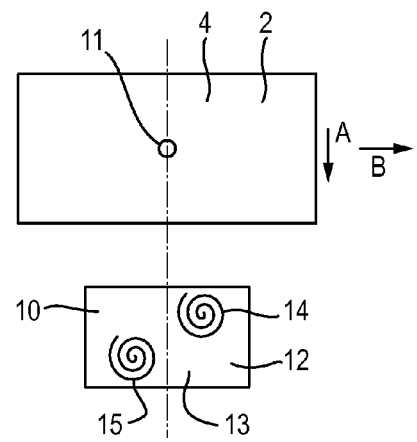
FIGS. 2 to 4 are diagrams of alternative arrangements for the sensor arrangement of FIG. 1 showing the facing surfaces of the shaft and a sensor element.
Figure 3:
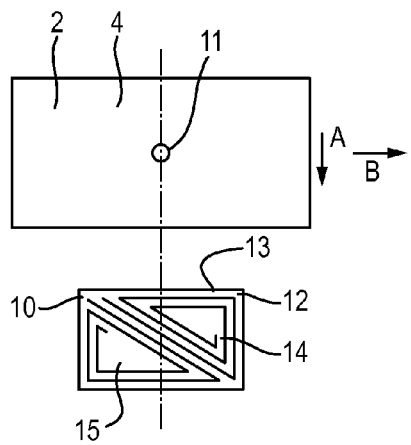
Figure 4:
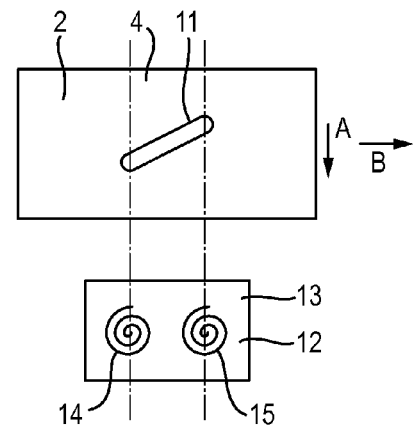

The coils 14 and 15 and the target feature 11 co-operate and may take a variety of configurations. Some examples of suitable configurations are shown in FIGS. 2 to 4 which each show (a) the cylindrical portion 4 having the target feature 11 formed therein and (b) the curved surface 12 of the sensor element 10 that faces the cylindrical portion 4.

The coils 14 and 15 are capable of being driven by oscillatory drive signals. When so driven, the coils 14 and 15 generate electromagnetic fields that extend to and interact with the cylindrical portion 4 of the shaft 2.

The coils 14 and 15 may be of any shape. In the examples of FIGS. 2 and 4, the coils 14 and 15 are circular. In the example of FIG. 3, the coils 14 and 15 are triangular. The coils 14 and 15 could equally be any other shape, such as square, rectangular or hexagonal.

The coils 14 and 15 may be planar coils in which each of the turns are arranged in a common plane. This advantageously reduces the thickness of the coils 14 and 15. For example, the coils 14 and 15 may be formed by tracks on a printed circuit board. However, the coils 14 and 15 could have other configurations, for example being formed by stacked planar sheets or being cylindrical.

The coils 14 and 15 may be the same configuration to provide identical electromagnetic fields that interact with the target feature 11 in the same manner. This is advantageous in providing similar signals from each coil 14 and 15, although not essential.

The target feature 11 is configured to interact with electromagnetic fields generated by the coils 14 and 15 when the target feature 11 is aligned with the coils 14 and 15 on each rotation of the shaft 2.

In the illustrated example, the target feature 11 is an indentation, for example a hole in FIGS. 2 and 3 and a groove in FIG. 4. In the case that the cylindrical portion 4 is made of a material such as metal that interacts with the electromagnetic field generated by the coils 14 and 15, then a target feature 11 in the form of an indentation interacts with the electromagnetic field in a different manner from the remainder of the cylindrical portion 4. A target feature 11 in the form of an indentation has the advantage that it allows the sensor element 10 to be provided close to the cylindrical portion 2.

However, in general the target feature 11 could have any form that interacts with the electromagnetic field generated by the coils 14 and 15. One example of an alternative form for the target feature 11 is a protrusion, although this may compromise the ability to accurately measure changes in distance to the cylindrical surface 4 as the coils 14 and 15 will always have to be clear of the protruding target feature 11. Sensing of angular velocity, and axial shift would however be unaffected. Another example of an alternative form for the target feature 11 is a body formed of a different material from the remainder of the shaft 2, either recessed into the shaft 2 or protruding therefrom.

The target feature 11 could be formed integrally with the cylindrical portion 4 or could be formed separately and mounted thereon, for example on a collar fitted to the shaft 2.

The configuration of the coils 14 and 15 and the target feature 11 is chosen so that the target feature 11 is aligned with the respective coils 14 and 15 at angular positions of the shaft that are offset, and further so that the degree of interaction between the target feature 11 and the electromagnetic fields generated by the coils 14 and 15 varies with the axial position of the shaft 2, preferably varying with the axial position differentially between the coils 14 and 15.

This is achieved in the examples of FIGS. 2 to 4 as follows.

In the examples of FIGS. 2 and 3, the target feature 11 is circular and the coils 14 and 15 are offset angularly around the shaft 2, i.e. the first coil 14 is higher than the second coil 15 in FIGS. 2 and 3. Thus, as the shaft 2 rotates in direction A, the target feature 11 is aligned with the first coil 14 when the shaft 2 is in a first angular position, and after further rotation is aligned with the second coil 15 when the shaft 2 is in a second angular position offset from the first angular position.

Furthermore, as the shaft 2 moves axially, the degree of interaction between the target feature 11 and the electromagnetic fields generated by the coils 14 and 15 when the target feature 11 is angularly aligned with the respective coils 14 and 15 varies with the axial position of the shaft 2, because the target feature 11 moves closer to, or further away from the center of each coil 14 and 15. In the examples of FIGS. 2 and 3, the coils 14 and 15 are offset axially and so the variation in the degree of interaction when the target feature 11 is angularly aligned with the respective coils 14 and 15 is differential between the coils 14 and 15. For example, if the shaft 2 moves axially in direction B then the interaction with the first coil 14 increases and the interaction with the second coil 15 decreases.

As an alternative, the coils 14 and 15 in the examples of FIGS. 2 and 3 could be moved to be aligned axially. In that case, the degree of interaction between the target feature 11 and the electromagnetic fields generated by the coils 14 and 15 when the at least one target feature is angularly aligned with the respective coils would still vary with the axial position of the shaft 2, but not differentially since the variation with axial position for each coil 14 and 15 would be the same.

In the example of FIG. 4, the coils 14 and 15 are aligned angularly around the shaft 2, i.e. the first coil 14 is at the same height as the second coil 15 in FIG. 4. However, the target feature 11 is elongate and extends helically across the cylindrical portion 4 between the axial positions of the coils 14 and 15. Thus, as the shaft 2 rotates in direction A, the target feature 11, in particular the left end of the target feature 11 in FIG. 4, is aligned with the first coil 14 when the shaft 2 is in a first angular position, and after further rotation the target feature 11, in particular the right end of the target feature 11 in FIG. 4, is aligned with the second coil 15 when the shaft 2 is in a second angular position offset from the first angular position.

Furthermore, as the shaft 2 moves axially, the degree of interaction between the target feature 11 and the electromagnetic fields generated by the coils 14 and 15 when the target feature 11 is angularly aligned with the respective coils 14 and 15 varies with the axial position of the shaft 2, because the target feature 11 overlaps each coil 14 and 15 to a greater or lesser extent. In the example of FIG. 4, the variation in the degree of interaction is differential between the coils 14 and 15. For example, if the shaft 2 moves axially in direction B then the interaction with the first coil 14 decreases (less overlap) and the interaction with the second coil 15 increases (more overlap).

Of course, the coils 14 and 15 and the target feature 11 could equally be designed with other configurations to provide a similar effect.

Figure 5:
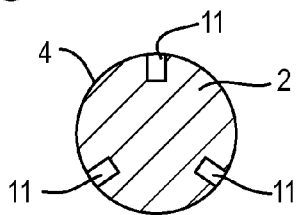
FIG. 5 is a cross-sectional view of a shaft of a sensor arrangement with three target features.

In the case of a single target feature 11, the target feature 11 interacts with each of the coils 14 and 15 once per revolution. To improve the dynamic balance of the shaft 2 it may be desirable to include plural target features arranged symmetrically around the shaft 2, with the result that the target feature 11 produces interactions plural times per revolution. By way of example, FIG. 5 illustrates a case in which there are three target features 11 disposed at angular positions separated by 120°.

Similarly, although the present example includes two coils 14 and 15, in general one or more additional coils could also be provided.

Figure 6:
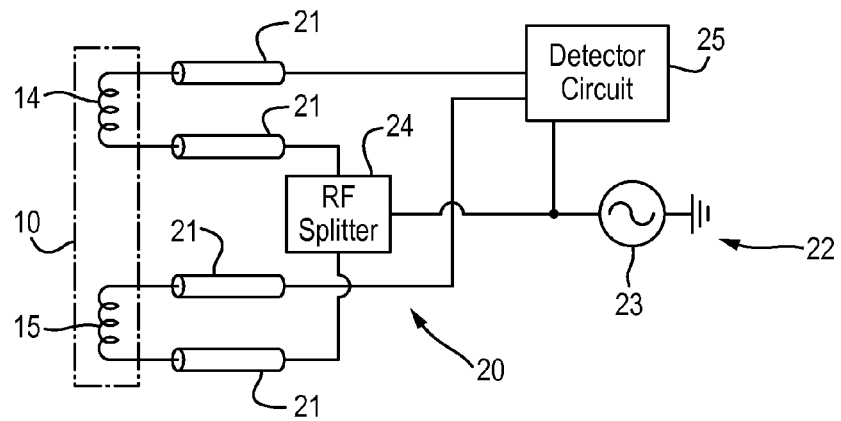
FIG. 6 is a diagram of the electrical circuit of the sensor arrangement.

There will now be described the electrical circuit 20 of the sensor arrangement 1 which is shown in FIG. 6.

The electrical circuit 20 is connected to the coils 14 and 15 through cables 21 which allows the electrical circuit 20 to be physically separated from the sensor element 10. In this manner, the electrical circuit 20 may be provided in an environment that is less harsh than the around the shaft 2, for example a temperature-controlled environment. This protects the electrical circuit 20 which contains electrical components that are less robust than the coils 14 and 15. This approach also enables the sensor element 10 and electrical circuit 20 to be located opposite sides of a pressure barrier. The cables 21 may be replaced by a transmission line, such as a coaxial cable, for each coil 14 and 15, with appropriate matching circuits.

The electrical circuit 20 includes a drive circuit 22 arranged to supply the coils 14 and 15 with an oscillatory drive signal which is a radio frequency (RF) signal. In this example, the drive signal has a fixed frequency. In general, the radio-frequency of the drive signal may be a frequency within the range from 1 MHz to 100 GHz. Lowering the frequency of the drive signal reduces the sensitivity, for which reason the frequency may typically be at least 1 MHz.

Typically, the frequency of the drive signal may be at most 100 MHz, as higher frequencies may require more complicated electronics.

The frequency of the drive signal may be at a resonant frequency of the coils 14 and 15. Alternatively, the frequency of the drive signal may be at a frequency below, but close to, a resonant frequency of the coils 14 and 15, for example at a frequency (a) that is below the resonant frequency of the coils 14 and 15 by at least ($\omega 0/Q$), where $\omega 0$ is the resonant frequency of the coils 14 and 15 and Q is the quality factor, and (b) that is at most (R/L), where R is the sum of the resistance of the coils 14 and 15 and the source impedance of the drive circuit 22 and L is the inductance of the coils 14 and 15. In this case, additional sensitivity can be achieved in accordance with the principles disclosed in US-2013/0076373, the teachings of which may be applied to the present embodiment.

The drive circuit 22 includes an oscillator 23 which generates the drive signal and an RF splitter 24 connected to each coil 14 and 15 through the cables 21 and arranged to splits the drive signal for supply to each coil 14 and 15. The RF splitter 24 is not essential in which case the two driven sides of the coils 14 and 15 could be connected via a single cable 21.

The drive signal causes each coil 14 and 15 to generate the electromagnetic field which interacts with the target feature 11 as discussed above. The electromagnetic field interacts with the cylindrical portion 4, inducing an eddy current in its surface which generates an opposing field that reduces the field inside the impeller 11 to zero within a short distance from the surface, thereby affecting the impedance of the coils 14 and 15. The target feature 11 interacts with this electromagnetic field when aligned with the coils 14 and 15, by changing the impedance.

Figure 7:
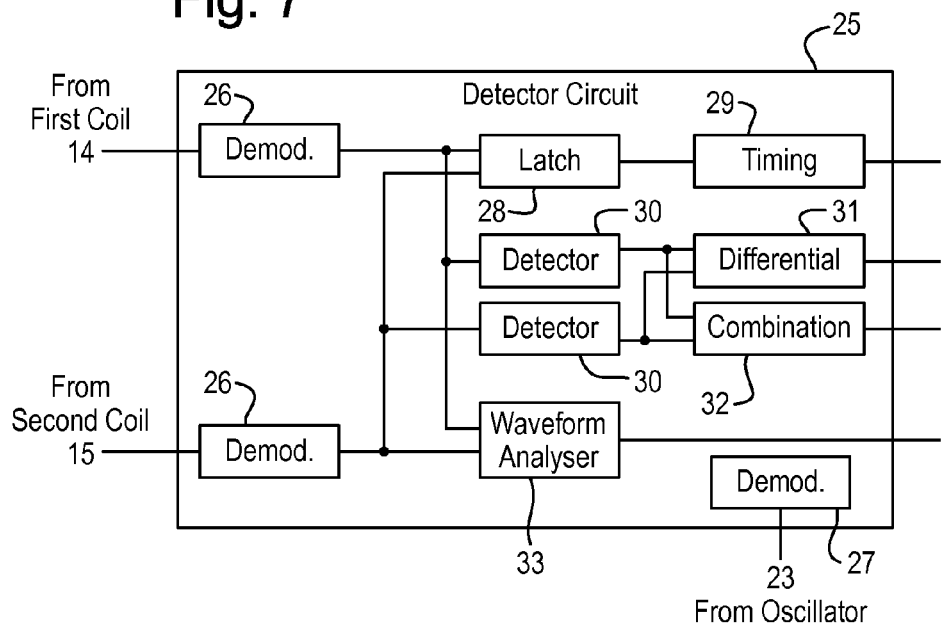
FIG. 7 is a diagram of a detector circuit in the electrical circuit of FIG. 6.

The electrical circuit 20 also includes a detector circuit 25 that is connected to each coil 14 and 15 through the cables 21. The detector circuit 25 detects the amplitude of the signal developed across each coil 14 and 15 and is arranged as shown in FIG. 7. In particular, the detector circuit 25 comprises amplitude demodulators 26 that demodulates the signals developed across the respective coils 14 and 15 to provide output signals representative of the amplitudes. Since the RF drive signal has a fixed frequency, those amplitudes are a characteristic of the signal developed across the respective coils 14 and 15 that is dependent on the interactions between the target feature 11 and the electromagnetic fields generated by the coils 14 and 15, and therefore change when the target feature 11 interacts with the respective coils 14 and 15.

The detector circuit 26 may be supplied with the drive signal output by the oscillator 23 as a reference for the demodulation performed by the amplitude demodulators 26. The detector circuit 25 may also comprise a reference signal amplitude demodulator 27 that demodulates the drive signal to provide a reference signal which can be used to compensate for any changes in the oscillator drive voltage with time or temperature.

As an alternative, separate drive circuits 45 could be provided for each of the coils 43. However, the provision of a single drive circuit 45 provides the advantage of ensuring that the coils 43 are supplied with identical RF drive signals which improves accuracy of the impeller sensor 40.

In the above examples, the drive signal has a fixed frequency, but this is not essential. As an alternative, drive circuit 21 may be arranged to supply the coils 14 and 15 with a drive signal of variable frequency, for example a frequency that is dependent on the interaction of the electromagnetic field with the cylindrical portion 2, and hence dependent on the impedance of the coils 14 and 15. In that case, the detector circuit 25 may detect the frequency of the signal developed across the coils 14 and 15 as a characteristic of that signal that varies with the interaction between the target feature 11 and the electromagnetic fields generated by the coils 14 and 15. An example of a drive circuit 45 of this type is a Robinson oscillator. Another example of a drive circuit 45 of this type is disclosed in US-2010/0213929, the teachings of which may be applied to the present embodiment.

In general, the detector circuit 26 may detect any characteristic of the signals developed across the coils 14 and 15 that is dependent on the interaction between the target feature 11 and the electromagnetic fields generated by the coils 14 and 15. Suitable characteristics include amplitude, frequency, the quality factor or the impedance itself.

The detector circuit 26 uses the detected characteristic of the signals developed across the coils 14 and 15 to sense several operational parameters of the shaft 2, as follows.

The sensor arrangement 1 senses the angular velocity of the shaft 2 as follows.

The output signals from the amplitude demodulators 26 are supplied to a bistable latch 28, that produces a latch output that goes high when the amplitude of the signal developed across the first coil 14 goes high, because the target feature 11 interacts with the first coil 14, and which goes low when the amplitude of the signal developed across the second coil 15 goes high, because the target feature 11 interacts with the second coil 15. FIGS. 8 and 9 illustrate examples of the output signals from the amplitude demodulators 26 and the resultant latch output where the shaft 2 is rotating in direction A (so the target feature 11 interacts initially with the first coil 14) and in the opposite direction (so the target feature 11 interacts initially with the second coil 15).

Accordingly and as illustrated in FIGS. 8 and 9, the latch output is a pulsed signal including a pulse which is representative of the angular velocity of the shaft 2. That is the latch output has a low duty cycle (latch output normally low with a high pulse) when the shaft rotates in a forward direction (direction A) and a high duty cycle (latch output normally high with a low pulse) when the shaft rotates in the reverse direction. Also, the pulse has a length equal to the difference between the timings of the interactions between the target feature 11 and the electromagnetic fields generated by the coils 14 and 15.

The detector circuit 25 further comprises a timing unit 29 which is supplied with the latch output from the bistable latch 28. The timing unit 29 detects the sign and length of the pulse in the latch output and based on those derives and outputs an angular velocity signal representative of the angular velocity of the shaft 2. The timing unit 29 may be implemented by an analog or digital circuit. The timing circuit 29 may for example count the time between the beginning and end of the pulse or by some other technique, for example by averaging the latch signal and measuring the amplitude of the averaged signal.

If the shaft 2 has axial movement then the relative size of the output signals from the amplitude demodulators 26 when the target feature 11 is angularly aligned with the respective coils 14 and 15 will also change. This does not affect the ability to sense direction as that depends only on the relative timing of those signals. However, the size of the output signals from the amplitude demodulators 26 when the target feature 11 interacts with the coils 14 and 15 does allow the axial position of the shaft 2 to be sensed, because the degree of interaction between the target feature 11 and the electromagnetic fields generated by the coils 14 and 15 when the target feature 11 is angularly aligned with the respective coils 14 and 15 varies with that axial position.

To illustrate this, FIG. 10 shows three examples (a) to (c) of the output signals from the amplitude demodulators 26 when the axial position of the shaft 2 is (a) shifted towards the first coil 15 which therefore has a higher degree of interaction when angularly aligned with the feature 11, (b) in a central position so both coils 14 and 15 have equal interactions when angularly aligned with the feature 11, and (c) shifted towards the second coil 15 which therefore has a higher degree of interaction when angularly aligned with the feature 11.

On this basis, the sensor arrangement 1 senses the axial position of the shaft 2 as follows.

The detector circuit 25 comprises detector units 30 that are supplied with the output signals from the amplitude demodulators 26. The detector units 30 detect the amplitude of the interaction, that this the amplitude while the target feature 11 interacts with the electromagnetic fields generated by the coils 14 and 15, that is during the pulse in the output signal from each amplitude demodulator 26.

The detector circuit 25 also comprises a differential unit 31 supplied with the outputs from the detector units 30 representing the detected amplitudes. The differential unit 31 detects the differential between the detected amplitudes, which corresponds to the differential between the degree of interaction between the target feature 11 and the electromagnetic fields generated by each coil 14 and 15 when the target feature 11 is angularly aligned with the respective coils 14 and 15. The differential unit 31 may detect the difference between, or the ratio of the detected amplitudes. The degree of interaction with each coil 14 and 15 may also change with the clearance between the target feature 11 and the coils 14 and 15, following the same relationship with distance. For this reason it is preferable to detect the ratio to determine axial position, but subtraction can also provide sufficient accuracy, particularly if the axial shift is minimal and/or there is minimal change in the clearance.

The output of the differential unit 31 is therefore an axial position signal representative of the axial position of the shaft 2.

The sensor arrangement 1 senses the clearance between the shaft 2 and the coils 14 and 15 as follows.

As the shaft 2 rotates the degree of interaction when the target feature 11 passes a coil 14 or 15 is dependent on the clearance therebetween.

The detector circuit 25 also comprises a combination unit 32 supplied with the outputs from the detector units 30 representing the detected amplitudes of the interaction between the target feature 11 and the electromagnetic fields generated by the coils 14 and 15. The combination unit 32 combines the detected amplitudes, for example by addition, to derive a clearance signal representative of clearance between the shaft 2 and the coils 14 and 15.

More generally, the detector circuit 25 may sense the clearance using any suitable characteristic of the signals developed across the coils 14 and 15, for example as disclosed in US-2013/0076373, the teachings of which may be applied.

The sensor arrangement 1 senses eccentricity in the rotation of the shaft 2 as follows.

The degree of interaction between the cylindrical portion 4 of the shaft 2 outside the interaction between the target feature 11 and the electromagnetic fields generated by the coils 14 and 15 is affected by the degree of eccentricity of the rotation of the shaft 2. By way of example, FIGS. 11 and 12 illustrate the output signal from one of the amplitude demodulators 26 in two examples of eccentric behavior of the shaft 2. The eccentric rotation causes a corresponding modulation of the baseline between the signals from the target feature 11. FIG. 11 illustrates the case of an orbiting motion of the shaft 2 causing a corresponding smooth modulation. FIG. 12 illustrates the case of a random vibration causing a corresponding random modulation. Other forms of eccentric rotation may occur in which case corresponding modulation would similarly occur.

To analyze this aspect of the signal, the detector circuit 25 comprises a waveform analyzer 33 supplied with the outputs from the detector units 30 representing the detected amplitudes of the interaction between the target feature 11 and the electromagnetic fields generated by the coils 14 and 15. The waveform analyzer 33 analyses the waveform of signal outside the interaction between the target feature 11 and the electromagnetic fields generated by the coils 14 and 15 and on the basis of that analysis derives an eccentricity signal representative of eccentricity in the rotation of the shaft 2. The waveform analyzer 33 may use conventional waveform analysis techniques to determine characteristics that are representative of the eccentric behavior such as the frequency and amplitude of the component signals.

Thus, the detector circuit 25 simultaneously measures several operational parameters of the shaft 2, namely angular velocity, axial shift, eccentricity and clearance. This is achieved using a single non-contact sensing element 10 which can be packaged to withstand challenging environments.

The sensor arrangement may be applied to any rotatable element of a rotating machine. The sensor arrangement has particular application in the petrochemical or mining industries, for example in sub-sea processing applications or in down-hole applications, both of which are environments where monitoring of machinery is important. Some non-limitative examples are that the rotatable element forms part of a top drive, an electrical submersible pump, a compressor, a mud motor, a stimulation pump, a slurry pump, or a multi-phase pump.

The invention claimed is:

1. A sensor arrangement for a rotatable element that has a variable axial position, the sensor arrangement comprising:
    a rotatable element having a cylindrical portion;
    at least two coils overlying the cylindrical portion in different positions and capable of being driven by oscillatory drive signals to generate electromagnetic fields,
    wherein the cylindrical portion has at least one target feature that is configured to interact with electromagnetic fields generated by the coils when the target feature is angularly aligned therewith,
    a drive circuit arranged to supply oscillatory drive signals to the coils for generating electromagnetic fields in the coils; and
    a detector circuit arranged to detect a characteristic of the signals developed across the coils to which the oscillatory drive signals are supplied, wherein said characteristic is dependent on the interactions between the at least one target feature and the electromagnetic fields generated by the coils
    wherein, the coils and the target feature are configured so that alignment between the at least one target feature and the coils occurs at angular positions of the rotatable element that are offset for respective coils, and so that the degree of interaction between the at least one target feature and the electromagnetic fields generated by the coils when the at least one target feature is angularly aligned with the respective coils varies with the axial position of the rotatable element,
    wherein, the detector circuit is arranged to detect the difference between the timings of the interactions between the at least one target feature and the electromagnetic fields generated by the coils and to derive therefrom an angular velocity signal representative of the angular velocity of the rotatable element,
    wherein, the detector circuit is arranged to detect the degree of interaction between the at least one target feature and the electromagnetic fields generated by the coils when the at least one target feature is angularly aligned with the respective coils and to derive therefrom an axial position signal representative of the axial position of the rotatable element.

2. A sensor arrangement according to claim 1, wherein the coils and the target feature are configured so that the degree of interaction between the at least one target feature and the electromagnetic fields generated by the coils when the at least one target feature is angularly aligned with the respective coils varies with the axial position of the rotatable element differentially between the coils.

3. A sensor arrangement according to claim 1, wherein the coils are offset angularly around the rotatable element.

4. A sensor arrangement according to claim 1, wherein the coils are aligned angularly around the rotatable element and offset axially along the rotatable element, and the target feature extends helically across the cylindrical portion between the axial positions of the coils.

5. A sensor arrangement according to claim 1, wherein the target feature is an indentation in the cylindrical portion.

6. A sensor arrangement according to claim 1, wherein the cylindrical surface has plural target features arranged symmetrically around the rotatable element.

7. A sensor arrangement according to claim 1, wherein the coils are encased in a sensing element having a curved surface facing the rotatable element.

8. A sensor arrangement according to claim 1, wherein the rotatable element is a shaft.

9. A sensor arrangement according to claim 1, wherein the rotatable element forms part of a top drive, an electrical submersible pump, a compressor, a mud motor, a stimulation pump, a slurry pump, or a multi-phase pump.

10. A sensor arrangement according to claim 1, wherein the oscillatory drive signals are radio frequency drive signals.

11. A sensor arrangement according to claim 1, wherein the detector circuit is arranged to detect the degree of interaction between the cylindrical portion outside the at least one target feature and the electromagnetic fields generated by the coils and to derive therefrom an eccentricity signal representative of eccentricity in the rotation of the rotatable element.

12. A sensor arrangement according to claim 1, wherein the detector circuit is arranged to derive a clearance signal representative of clearance between the rotatable element and the coils from the detected characteristic of the signals developed across the coils.

* * * * *